United States Patent
Ma et al.

(10) Patent No.: US 7,533,399 B2
(45) Date of Patent: May 12, 2009

(54) PROGRAMMING GUIDE CONTENT COLLECTION AND RECOMMENDATION SYSTEM FOR VIEWING ON A PORTABLE DEVICE

(75) Inventors: Yue Ma, Princeton Junction, NJ (US); Jinhong Guo, Princeton Junction, NJ (US); Jingbo Zhu, Shenyang (CN); Anhui Wang, Shenyang (CN); Wenliang Chen, Shenyang (CN); Tianshun Yao, Shenyang (CN)

(73) Assignee: Panasonic Corporation, Osaka (JP)

(*) Notice: Subject to any disclaimer, the term of this patent is extended or adjusted under 35 U.S.C. 154(b) by 832 days.

(21) Appl. No.: 11/002,992

(22) Filed: Dec. 2, 2004

(65) Prior Publication Data

US 2006/0123448 A1   Jun. 8, 2006

(51) Int. Cl.
  G06F 3/00 (2006.01)
  G06F 13/00 (2006.01)
  H04N 5/445 (2006.01)
(52) U.S. Cl. ..................................... 725/46
(58) Field of Classification Search ............... 725/9, 725/44–46, 53, 39, 56; 706/45
See application file for complete search history.

(56) References Cited

U.S. PATENT DOCUMENTS

| | | | |
|---|---|---|---|
| 6,268,849 B1 * | 7/2001 | Boyer et al. | 725/40 |
| 7,051,352 B1 * | 5/2006 | Schaffer | 725/39 |
| 7,328,216 B2 * | 2/2008 | Hofmann et al. | 707/100 |
| 2006/0074634 A1 * | 4/2006 | Gao et al. | 704/9 |

FOREIGN PATENT DOCUMENTS

WO   WO 0115449 A1 *   3/2001

* cited by examiner

*Primary Examiner*—Scott Beliveau
*Assistant Examiner*—Bennett Ingvoldstad
(74) *Attorney, Agent, or Firm*—Harness, Dickey & Pierce, PLC

(57) ABSTRACT

An EPG contents collection and recommendation system includes an EPG database of identifications of available programs. A program information acquisition module applies text classification to detailed descriptions of the available programs. An EPG recommendation module recommends an available program to a user based on the text classification. Preferably, EPG contents are collected from publicly available TV websites and parsed into a uniform format. For example, contents are vectorized, and a Maximum Entropy technique is applied. Also, user interaction with the EPG database is used to form a user profile database. Further, classifiers are trained based on contents of the user profile database, and these classifiers are used to recommend EPG contents to the user.

4 Claims, 8 Drawing Sheets

PROGRAMMING GUIDE CONTENT COLLECTION AND RECOMMENDATION SYSTEM FOR VIEWING ON A PORTABLE DEVICE

FIELD OF THE INVENTION

The present invention generally relates to access and use of electronic programming guides, and particularly relates to automatic collection, organization, and use of electronic programming guide contents from multiple sources, including recommendation of contents based on user media consumption.

BACKGROUND OF THE INVENTION

Today's electronic programming guides (EPGs) are made available to media consumers and used in various ways. For example, a cable operator/MSO can broadcast a static EPG on a dedicated channel. Also, interactive EPGs are offered through premium cable subscription and an add-on set-top box, with some of these systems featuring an adaptive EPG and program suggestion based on media consumer's habits. Further, Internet sites run by an MSO or an individual television (TV) station can provide EPG data. Yet further, EPG data can be provided via Internet portals run by TV entertainment service providers (such as Harmony Remote-a remote controller manufacturer, Panasonic-a home electronics manufacturer, Replay TV or Tivo, and others).

Yet, there are several problems that arise with respect to today's systems and methods of supplying and using EPG data. For example, EPG contents provided through multicasting have to be static because everyone in the multicasting session must receive the same information; accordingly, there can be no personalization of EPG contents. Also, EPGs provided through the Internet do not adapt to consumer's individual needs. Further, set-top boxes with adaptive EPGs and program suggestion are primitive, and only employ simple category, title, and keyword matching based on EPG contents provided by an MSO; accordingly, its capabilities and EPG source are limited.

The question arises whether a user viewing an EPG on a portable device with a limited display, memory, and network bandwidth would desire access to the same amount of information available at the user's home. As the amount of information available on the broadcasting network increases at an exponential rate, the problem of providing as much information as possible to the consumer while providing the most valuable information becomes increasingly challenging. Accordingly, the need remains for a system and method that supplies EPG contents to media consumers on a portable device in an efficient fashion that effectively automatically adapts to individual viewers. The present invention fulfills this need.

SUMMARY OF THE INVENTION

In accordance with the present invention, an EPG contents collection and recommendation system includes an EPG database of identifications of available programs. A program information acquisition module applies text classification to detailed descriptions of the available programs. An EPG recommendation module recommends an available program to a user based on the text classification.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
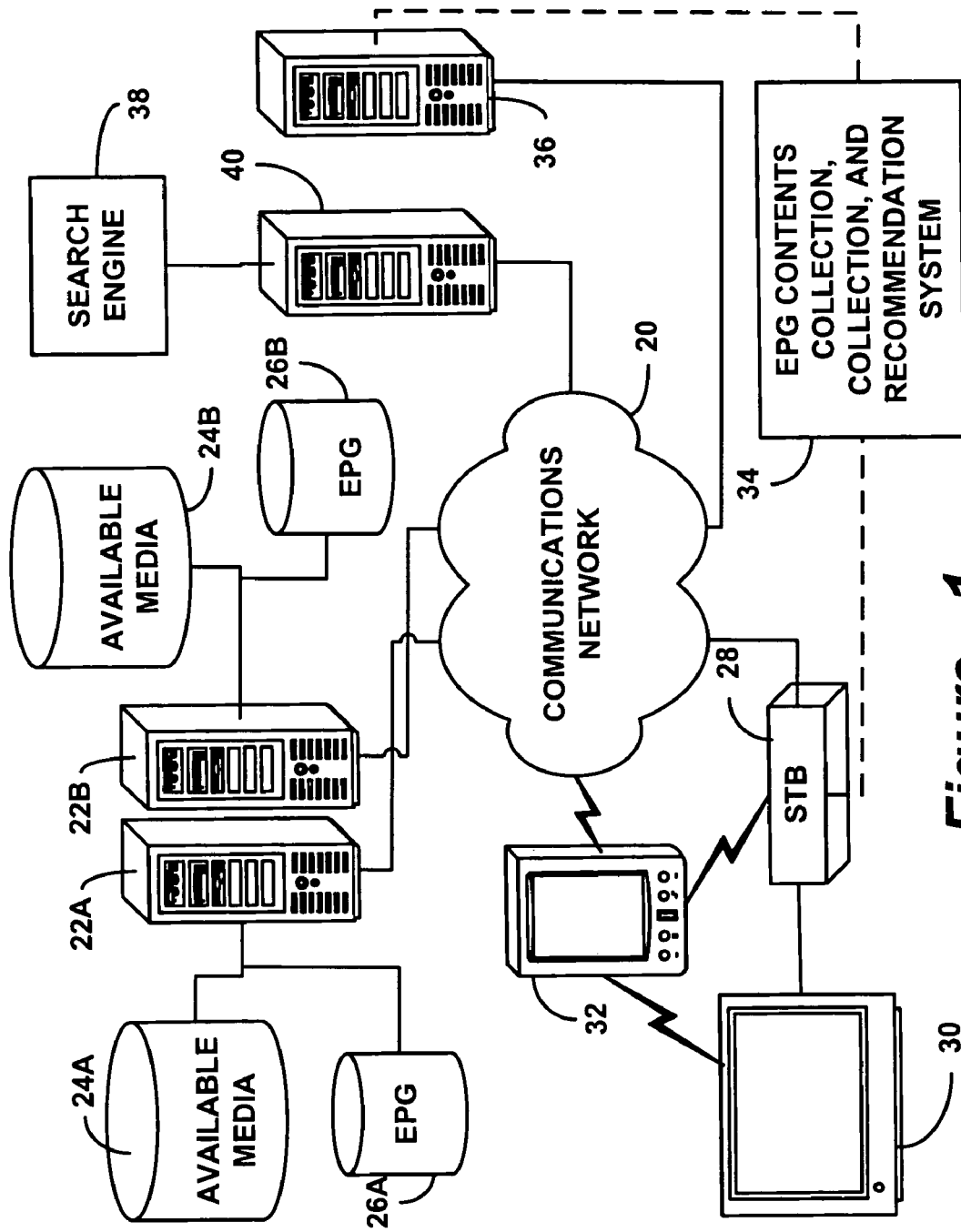
FIG. 1 is an entity relationship diagram illustrating implementation of an electronic programming guide contents collection, organization, and recommendation system according to the present invention.

Referring to FIG. 1, a communications network 20 provides connectivity between various members of the network. Communications network 20 can include the Internet, an airwaves broadcast network, a proprietary narrowcast cable network, and/or any other transmission medium. Members of the network 20 include multiple sources 22A and 22B of available media content 24A and 24B and/or EPG contents 26A and 26B. For example, source 22A can be a television network's or cable company's media distribution point providing a channel or channels of television programming to a consumer's set top box (STB) 28 via cable.

It should be readily understood that an electronic programming guide can accompany the programming. Alternatively or additionally, one or more of the channels can be simultaneously broadcast over airwaves, with or without EPG data embedded in the broadcast, to television media delivery device 30 and/or wireless portable device 32. Meanwhile, source 22B can be the television network's or cable provider's website, and can provide the same or additional streaming media television programming, web-pages of supplementary program information, and/or EPG contents via the Internet to STB 28 and/or devices 30 and 32. In either case, sources 22A and 22B can distribute media in scheduled time slots, in multicast sessions, and/or on demand.

Also, EPGs thus distributed can be in an HTML format, XML format, custom format, or any other format. It is envisioned that other types of media in other formats can be distributed by these or other types of entities. However, these typical television programming and EPG distribution modalities are particularly useful for demonstrating the functionality of the EPG contents collection, organization, and recommendation system 34 according to the present invention. Accordingly, while the present invention is demonstrated principally in the context of television media and typical modalities, it should be readily understood that contents of EPGs identifying radio programming, webpages, and other media can alternatively or additionally be collected, organized, and recommended according to the present invention.

EPG collection, organization, and recommendation system 34 can reside in software form in processor memory on STB 28. Alternatively or additionally, system 34 can reside in processor memory of proprietary Internet server 36, which may be provided by a manufacturer of device 32 and/or STB 28 and made accessible to device 32 and/or STB 28. In a client/server embodiment, portions of system 34 may reside on server 36 or STB 28, while other portions of system 34 reside on portable device 32. System 34 has various functions, one or which can be to search the Internet for sources of available media and/or EPG contents using an Internet search engine 38 supplied by server 40 of a search engine service provider, such as Google and others.

Figure 2:
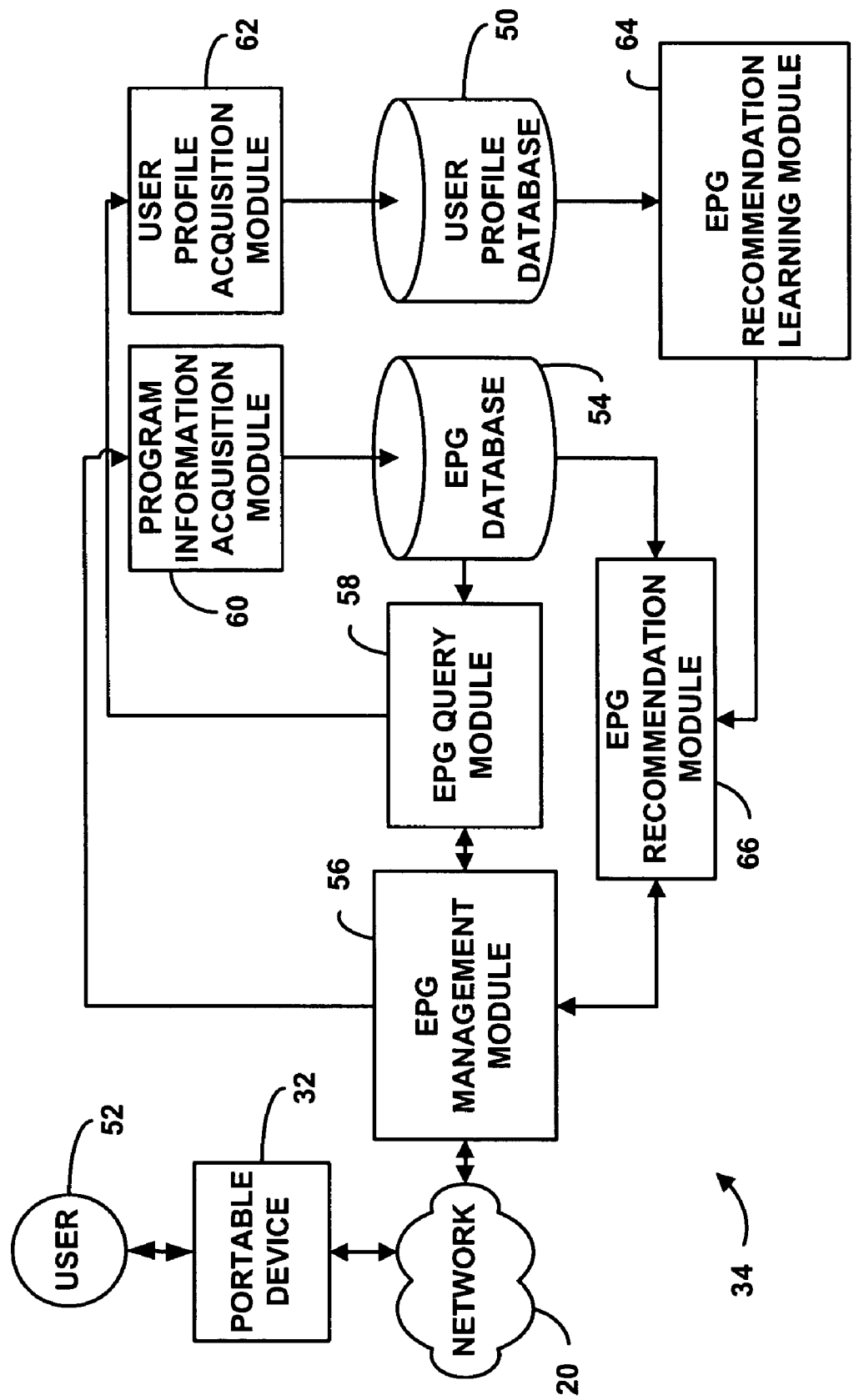
FIG. 2 is a block diagram illustrating the EPG contents collection and recommendation system according to the present invention.

Turning now to FIG. 2, the EPG contents collection and recommendation system 34 according to the present invention sets up a profile database 50 for one or more users by collecting program information viewed by the user 52. The EPG contents collection and recommendation system 34 analyses the profile data from profile database 50 and then recommends programs that the user 52 prefers. EPG contents of database 54 are recommended by adopting a multi-engine and multi-layer approach. The primary layers of analysis are the following three layers: Program Domain Recommendation: physical, military affairs, etc.; Program Categories Recommendation: film, news, etc.; and Content Recommendation: Use classifier based Maximum Entropy and KNN.

By way of overview, EPG contents collection and recommendation system 34 can be divided into several components: EPG management module 56, EPG query module 58, program information acquisition module 60, user profile acquisition module 62, EPG recommendation learning module 64, and EPG recommendation module 66. For example, EPG management module 56 accepts data from network 20 and sends result data back to network 20. Also, program information acquisition module 60 collects program information from TV web sites, parses the text data, converts the data into structural data, and stores the structured data in the EPG Database. Additionally, user profile acquisition module 62 collects user profile data and stores it in the user profile database 50. Further, EPG query module 58 provides common operations for user 52, such as browsing and querying programs of database 54. Yet further, EPG recommendation learning module 64 adjusts the parameters of the recommendation algorithm according to data from the user profile database 50. Further still, EPG recommendation module recommends programs of database 54 according to the user's setup.

EPG management module 56 is a total control module, possessing the following functions: receive data from portable device 32 terminal transmitted by the network; identify the application type contained in the data bundle, and send the application to the corresponding module according to the application type; receive the result from each function module, and deliver it to the network, transmitting to the portable device 32 terminal via the network 20 continuously.

EPG query module 58 is used to process the user's daily operation such as scanning programs. The working process of EPG Query module is as follows: receive the data bundle of the user's application for a program scan; parse the XML data in the bundle to get the content information scanned by the user; carry through operation to EPG database 54 according to the user's application to get the queried result; package the queried result as XML format, and then deliver it to EPG Manager; at the same time, deliver one copy of the queried result to the user profile acquisition module 62; therein, the last copy of the queried result delivered to user profile acquisition module 62 is used to obtain user profile data as further explained below with reference to FIG. 6.

Returning for now to FIG. 2, program information acquisition module 60 serves as the primary source of EPG data in some embodiments of the present invention. Program information data is the basis of EPG contents collection and recommendation system 34. The program information data can be obtained from program providers, and also can be obtained from Internet professional websites. The advantage of the former case is that the provider can provide the interface of data; therefore, data treatment is comparatively simple. However, a related disadvantage is program information is commonly limited. For the latter case, some of today's professional websites can provide very rich program information data; but a disadvantage is that the net station cannot provide the data interface, and that data treatment has to be performed before the data can be used by EPG recommendation module 66 according to the present invention.

The program information supplied to the user 20 is commonly in a semi-structural text format such as HTML and/or XML, and the text structure of the program information supplied to certain TV stations is commonly the same. Therefore, the useful information can be picked-up automatically. For example, TitanTV(http://www.titantv.com) can offer the future two week's electronic program information of many TV stations. TitanTV(http://www.titantv.com) is a feature-rich online program listings guide and is constantly growing. Its TV listings provide users with a program listings guide that is household-level—it provides channels available at a users' exact location. The parsed information can be used as a source of program information data in accordance with the present invention.

As mentioned above, program information about certain TV stations can be obtained from TV Web Sites. But today's information can not be used for recommendation directly, because its format is not suitable for the recommendation module. The program information acquisition module 52 is used to obtain program information and convert it into the format needed by the recommendation module 66. The result is stored in the EPG database 54, which is used for EPG recommendation later.

Figure 3:
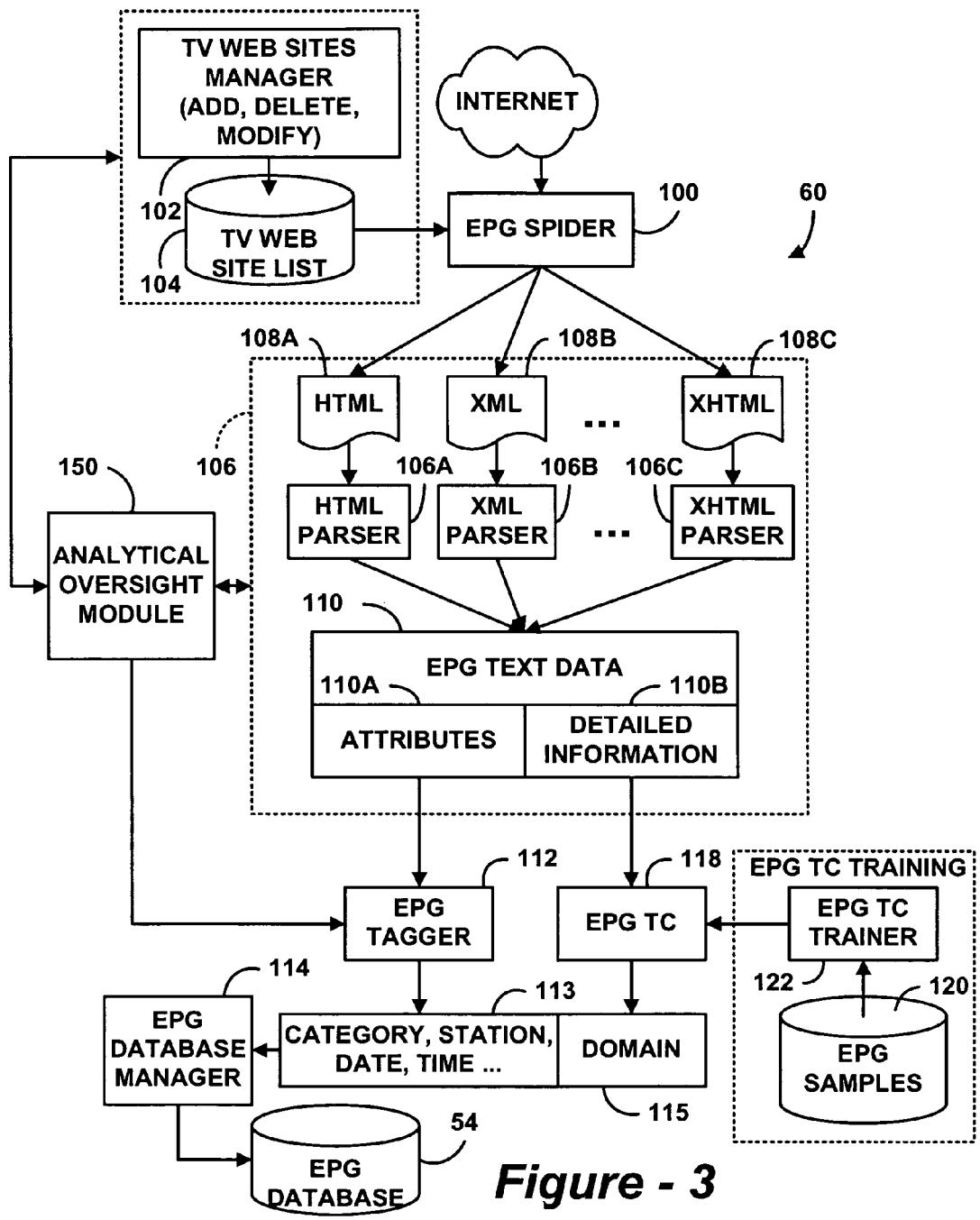
FIG. 3 is a block diagram illustrating the program information acquisition module according to the present invention.

Turning now to FIG. 3, program information acquisition module 60 obtains program information from TV web sites. Pages are first downloaded, including program information. EPG Spider sub-module 100 is designed for this task. Its function is simple. According to a super link of some channel, it can connect with the web site and download the whole page. Another sub-module, TV web sites manager 102, adds, deletes, or modifies names of web sites in TV web sites list 104, which is used by sub-module 100 to automatically obtain the program information from the websites continuously or periodically. Common TV Stations information is saved in TV web site list 104. Program information downloaded by EPG spider sub-module 100 is transmitted to EPG parser 106, which further processes the downloaded program information.

Usually, the program information downloaded by EPG spider sub-module 100 is presented as web pages 108A-C in various formats, including html, xml, etc., which are semi-structural text. Therefore, parser 106 is needed to parse these semi-structural data. Corresponding parsers 106A-C can be provided for the different formats, such as HTML parser 106A, XML parser 106B, and so on.

The data parsed by parser 106 can be divided into two parts: attributes 110A and detailed information 110B. They are together called EPG text data 110. Attributes 110A is data with some label, for example, title, category. This information can be directly used by EPG recommendation module. The detailed information 110B is the detailed description for a program and cannot be used directly in most embodiments. Therefore, the detailed information 110B is treated further.

It should be readily understood that EPG contents inherently identify available media by providing identifying information, such as: (1) a combination of a channel and time slot; (2) one or more of: (a) a multicasting server address; (b) a multicasting session ID; and (c) a url for a multicasting catalog providing (a) and/or (b) and indexed by information provided in the EPG contents; and (3) a url and/or other data for streaming on demand media.

Identification of sources of EPG contents can occur in various ways. For example, analytical oversight module 150 can observe user access of available media and/or EPGs. Observation can occur by recording the user's use of a portable device to control a media delivery device to access EPG contents, and/or by using a portable device as a media delivery device to access EPG contents. Alternatively or additionally, module 150 can use an Internet search engine to find available media and/or EPGs. Thus, some embodiments of module 150 can identify an interactive EPG arriving over a cable network, and also identify a webpage providing the same EPG contents relating to: (1) the same identified available media; (2) different EPG contents supplementing the same available media; (3) different EPG contents relating to different available media; and/or (4) same, similar, or supplemental EPG contents identifying the same media content available in a different way (i.e., time slotted narrowcast/broadcast media versus streaming, on demand and/or multicast media of identical content). As discussed above, identifications of sources of EPG contents and/or available media can be recorded by manager 102 in the list 104. Then, submodule 100 can browse the sources of EPG contents and provide the EPG contents to EPG parser 106.

Figure 4:
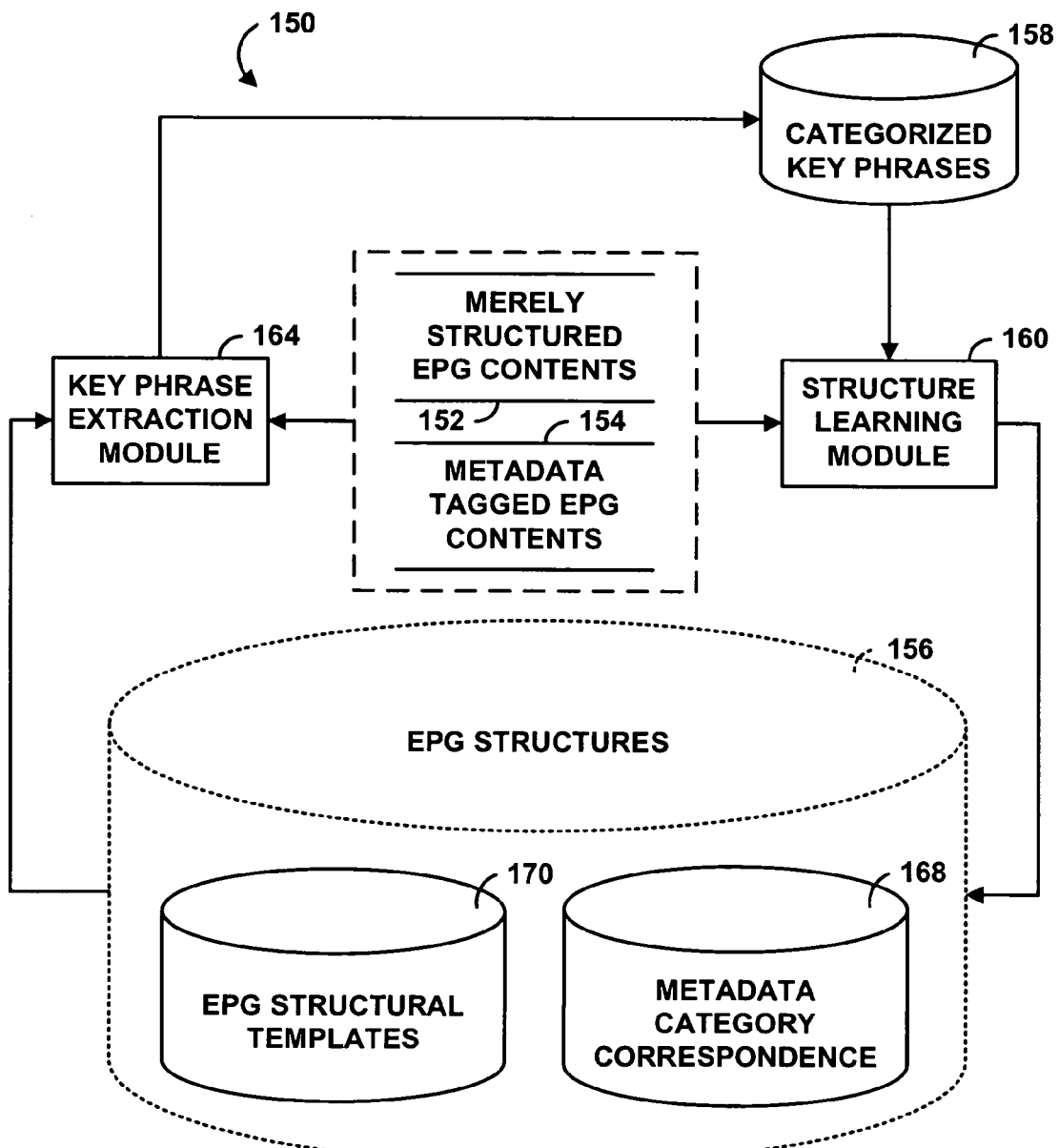
FIG. 4 is a block diagram illustrating the analytical oversight module according to the present invention.

Turning to FIG. 4, analytical oversight module 150 can assist the parser by helping to determine structures of new EPGs, such as document templates for locations of categorical information, and/or correspondence between metatags of new EPGs and categories employed by the recommendation module. For example, HTML structured EPG contents 152 and/or XML or other metadata tagged contents 154 can be provided to the parser, which in turn can parse the contents of the electronic programming guides based on the known structures of the electronic programming guides.

Parsing can occur in various ways. For example, structured contents can be parsed based on known structures of web pages provided by a particular source, with content categories mapped to document locations. For example, a two-dimensional grid containing timeslots on one axis and channels on the other can index television program titles that are known to serve as hyperlinks to textual descriptions of the programs. This known structure can be used to parse the contents. Also, HTML documents can describe an available program, and a known order of information categories and delimiters therefore can be used to parse the contents. It should be readily understood that document locations can be fixed, or can be dynamically determined based on a change in HTML tags or other delimiters. Accordingly, module 150 can identify the source of the document to the parser as needed for the parser to use the correct known structure 156 in parsing that HTML document. If a source uses more than one format, then the analytical oversight module 150 can analyze the document to determine which format it most likely conforms to, and then instruct the parser to extract and categorize the EPG contents accordingly.

In addition or as an alternative to the aforementioned parsing techniques, the parser can use known, categorized key phrases 158 to identify and categorize portions of contents. For example, known titles of movies and/or TV shows can be used to identify and categorize the title of the available media, while known names of actors can be used to extract and categorize an actor's name from a description portion of the EPG contents. Other key phrases, such as "documentary", can be used to identify a type category for the available media. Where a structure of a document is not known, structure learning module 160 can develop a new structure template 170 by analyzing the structure using the key phrases to map categories to document locations. For example, extracting a known title can be used to determine that one of four textual (non HTML) portions of an HTML document is a title, while another portion can be identified as the description portion based on its length, and based on the fact that it contains various known names of actors following proper names and delimited by parentheses. The other two portions can be identified as time slot and channel respectively based on their lengths and conditions relating to their content characters (i.e., four capitalized letters and/or numbers absent a colon versus numbers alone containing a colon). Accordingly, a location for the title category can be recorded for the new structure as a first textual portion delimited by HTML tags of a certain type, while a location for the description category can be recorded as a second textual portion delimited by HTML tags of a second type. Time slot and channel categories can be similarly identified. Alternatively or additionally, locations for actor's names categories can also be identified as contents of the description delimited by parentheses and following proper names. Once the structure is learned, it can be used to parse unknown titles and other contents from other HTML documents from the same source.

It should also be understood that while XML or other metatags may inherently categorize otherwise non-structured contents, the metatags may not always match categories employed by the recommendation module, and/or may be incomplete as descriptors go. Accordingly, module 160 can determine correspondence 168 between the supplied metatags and metatag categories employed by the recommendation module using known, categorized keyphrases 158. For example, actors name's may be labeled "talent" in a supplied EPG in xml format, whereas the recommendation module uses the corresponding label "performer". Accordingly, identification of the known key phrase "Tom Cruise" tagged as "talent" in the obtained new EPG contents can be used to record a correspondence between the tag "talent" and the preferred tag "performer" in relation to the EPG source. Thereafter, the known correspondence can be used to retag contents from that source.

In addition to substituting preferred tags for supplied metatags, module 160 can supplement supplied metatags by learning a template 170 for a metatagged portion of a document. For example, a program description labeled as such may yet contain actors' names following proper names and delimited by parentheses. If so, a location can be recorded for the actors' names category within the metatagged portions, and used to extract names of unknown actors in similarly metatagged document portions from the same source.

It should be readily appreciated from the above description that analytical oversight module 150 is capable of analytically learning new structures of EPGs based on predefined, categorized key phrases. In addition, key phrase extraction module 164 analytically learns new categorized key phrases useful for determining new structures of electronic programming guides based on known structures 156 of EPGs. For example, the known title, "Gone with the Wind", can be used to learn a "title" location in a new EPG, which can in turn be used to extract an unknown title, "The Unforgiven", from another page from the same source. The new title can be added to the known titles, and subsequently used to learn new structures. User feedback can be employed to determine whether the new title is added. For example, addition of the new title can be conditioned on whether the user successfully interacts with a related portion of an EPG constructed from the parsed EPG contents as explained below. Accordingly, the system can be seeded with a few key phrases for content categories, such as well-known names of media, performers, directors, producers, etc., and the system can use this seed information to adaptively learn EPG structures. Alternatively or additionally, the system can be provided with one or more known structures, and the system can use the known structure to learn new key phrases for content categories. Finally, the system can be provide with one or the other of the seed key phrases or the seed structures, and still develop both new structures and new key phrases.

Returning to FIG. 3, the program information includes various attributes 110A such as program title, category, and others. The parser 106 can identify these attributes 110A exactly. After parsing, this attribute information can be tagged directly by tagger 112, and then the tagged attribute information 113 transmitted to EPG database manager 114 for addition to the EPG database 54.

Programs identified by programming information can be classified in various ways. For example, a category of a program can be determined from the attribute information obtained above. In particular, it can be determined whether the program is about news or entertainment according to its category from the attribute information. However, it is not typically possible to determine whether a general news program is about physical culture or society from the attribute information. Accordingly, the domain of the program can not be judged directly from the attribute information, but the domain information 115 is very important for EPG recommendation.

Note that, among the information obtained above, there is another kind of information, the detailed information 110B of the program. Usually, comparatively much more description information may be contained in the detailed information 110B of a program; therefore, the domain of the program can be classified by using the technology of text classification. Some embodiments of the present invention adopt the Maximum Entropy (ME) technique based text classifier 118, in which performance is good enough for most text classifying tasks.

In adopting the ME technique, it is first necessary to train an EPG training corpus. The corpus 120 is collected by experts, and the programs are divided into predefined domains. Example domains include Sports, Finance, and so on. Next, the classifier 118 is trained using the corpus 120 during a training process 122. After training, the classifier 118 can classify an input program into the predefined domains, thereby obtaining the domain information 115.

Figure 5:
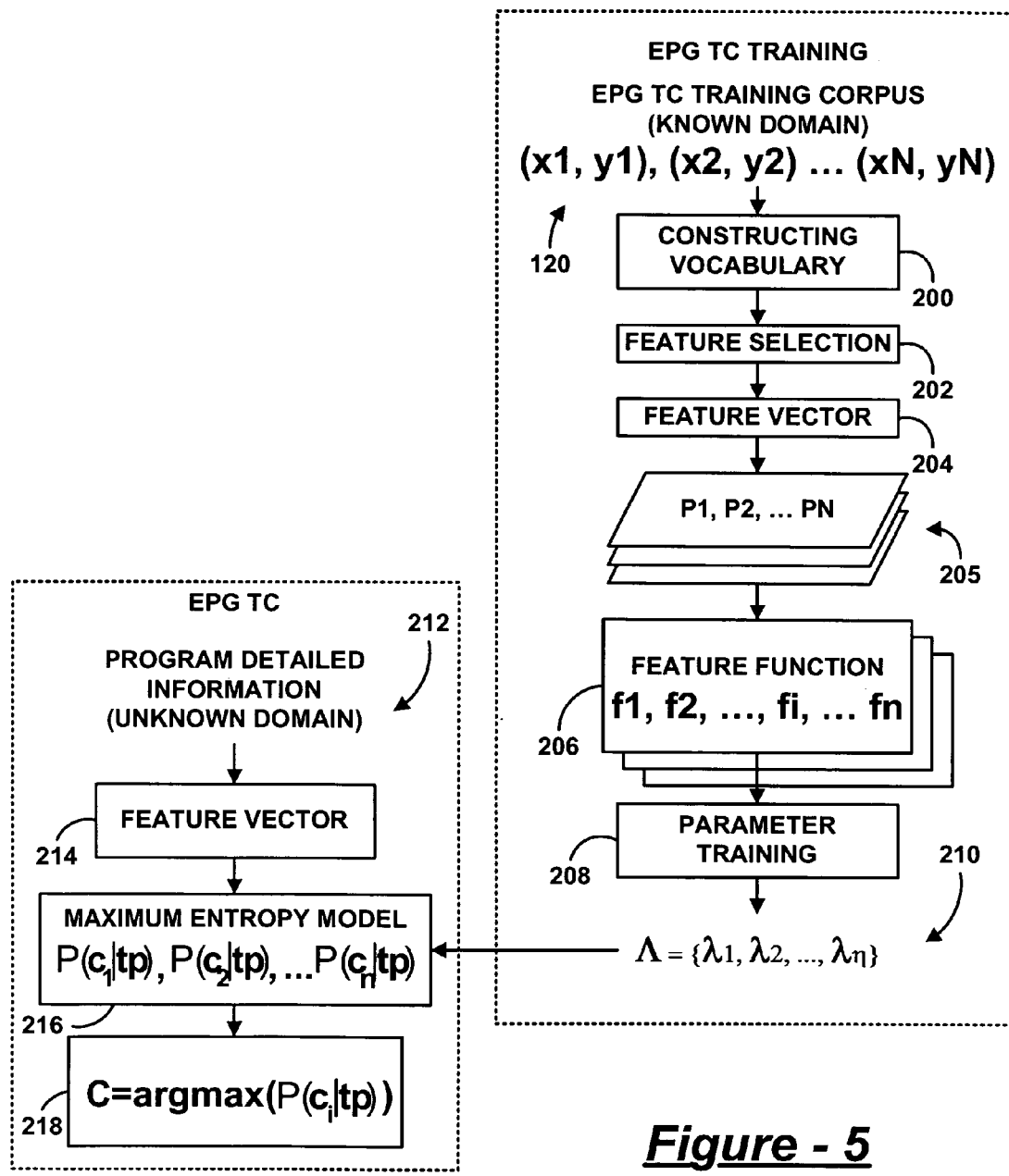
FIG. 5 is a flow diagram illustrating training of an EPG training corpus according to the present invention.

Turning to FIG. 5, a common and overwhelming characteristic of text data is its extremely high dimensionality. Typically the program vectors are formed using bag-of-words models. It is well known, however, that such count matrices tend to be high dimensional feature spaces. Therefore, feature selection is used according to the present invention to lower the feature space. In this way, the program is represented as a vector. The whole processing includes three components: 1) Constructing Vocabulary; 2) Feature Selection; and 3) Representation.

Constructing vocabulary at step 200 involves collection of all words in the contents of log samples of the training corpus 120. Stop words are removed from the list. Feature selection at step 202 is statistical in nature. The $\chi^2$ statistic measures the lack of independence between a word w and a domain c and can be compared to the $\chi^2$ distribution with one degree of freedom to judge extremeness. Using the two-way contingency table of a word t and a domain c, where A is the number of times t and c co-occur, B is the number of time the t occurs without c, C is the number of times c occurs without t, D is the number of times neither c nor t occurs, and N is the total number of documents, the term "goodness measure" is defined to be:

$$\chi^2(t, c) = \frac{N * (AD - CB)^2}{(A + C) * (B + D) * (C + D)}.$$

The $\chi^2$ statistic has a natural value of zero if t and c are independent. For each domain, the $\chi^2$ statistic can be computed between each unique term in a training sample and that domain. Then, the features for each domain can be extracted according to the value of the $\chi^2$ statistic.

Representation at step 204 can be accomplished in various ways. After the above steps, the features for categories have been obtained. It is then possible to use the bag-of-words model as the text representation. Accordingly, all programs can be the set of words with their frequency. Thus, the programs can be represented as at 205 as the vectors, P=<tf1, tf2, . . . , tfi, . . . , tfn>, where n denotes the size of features set, and tfi is the frequency of the $i^{th}$ feature.

The following example illustrates the foregoing steps. First, a wordlist is constructed.

Spin
City
Affair
Flashback
. . .

Then, feature selection removes some words that are common words. "City" is a common word, so it is removed.

Spin
Affair
Flashback
. . .

Now, a program is obtained:

Title: Spin City
Detail: An Affair Not to Remember A flashback to Caitlin and Charlie's college days, and his interference with her relationship, gives Caitlin doubt about her current beau. Tom: Perry King. Debbie: Jill Tracy. Tiffany: Rene Ashton. Chad: Johnny Hawkes. Britney: Sabrina Speer. (2002)

Program representation:

| Words: Spin, Affair, Flashback, ...  |
| Program:<1, 1, 1, . . . >            |

The present invention, uses Maximum Entropy as the classifier. Maximum Entropy (ME or MaxEnt) Model is a general-purpose machine-learning framework that has been successfully applied to a wide range of text processing tasks such as Language Ambiguity Resolution, Statistical Language Modeling and Text Categorization. Given a set of training samples $T=\{(x_1, y_1), (x_2, y_2), \ldots, (x_N, y_N)\}$ where $x_i$ is a real value feature vector and $y_i$ is the target domain, the maximum entropy principle states that data T should be summarized with a model that is maximally noncommittal with respect to missing information. Among distributions consistent with the constraints imposed by T, there exists a unique model with highest entropy in the domain of exponential models of the form:

$$P_\Lambda(y|x) = \frac{1}{Z_\Lambda(x)} \exp\left[\sum_{i=1}^{n} \lambda_i f_i(x, y)\right] \quad (1)$$

where $\Lambda=\{\lambda_1, \lambda_2, \ldots, \lambda_n\}$ are parameters of the model, $f_i(x,y)$'s are arbitrary feature functions the modeler chooses to model, and $$Z_\Lambda(x) = \sum_{y} \exp\left[\sum_{i=1}^{n} \lambda_i f_i(x, y)\right]$$

is the normalization factor to ensure $P_\Lambda(y|x)$ is a probability distribution. Moreover, it has been shown that the Maximum Entropy model is also the Maximum Likelihood solution on the training data that minimizes the Kullback-Leibler divergence between $P_\Lambda$ and the uniform model. Since the log-likelihood of $P_\Lambda(y|x)$ on training data is concave in the model's parameter space $\Lambda$, a unique Maximum Entropy solution is guaranteed and can be found by maximizing the log-likelihood function:

$$L_\Lambda = \sum_{x,y} \tilde{p}(x, y) \log p(y|x)$$

where $\tilde{p}(x,y)$ are empirical probability distribution. In practice, the parameter $\Lambda$ can be computed through numerical optimization methods. Some embodiments of the present invention, however, use the Limited-Memory Variable Metric method, a Limited-memory version of the method (also called L-BFGS) to find $\Lambda$. Applying L-BFGS requires evaluating the gradient of the object function L in each iteration, which can be computed as:

$$\frac{\partial L}{\partial \lambda_i} = E_{\tilde{p}} f_i - E_p f_i$$

where $E_{\tilde{p}} f_i$ and $E_p f_i$ denote the expectation of $f_i$ under empirical distribution $\tilde{p}$ and model p respectively.

In accordance with the present invention, the feature function is defined as the following:

$$f_{w,c'}(d, c) = \begin{cases} 0 & c \neq c' \\ tf(w, d) & c = c' \end{cases} \quad (2)$$

where, tf(w,d) denotes the frequency of the word w in program d.

An example of training processing in accordance with the present invention is now provided. All training programs can be represented as vectors. Accordingly, all training programs can be represented as the following:

$TP: tp_1, tp_2, \ldots, tp_i, \ldots, tp_n \rightarrow T=(V, C): (v_1, c_1), (v_2, c_2), \ldots, (v_i, c_i), \ldots, (v_n, c_n)$ where, TP denotes training programs set, $tp_i$ denotes one training program, V denotes the vectors, and C denotes the domains. Then, the feature function set F can be constructed at step 206 using Equation 2 from above T. The parameters $\Lambda=\{\lambda_1, \lambda_2, \ldots, \lambda_n\}$ are obtained at 210 using a MaxEnt training tool in step 208.

After training processing, F and $\Lambda=\{\lambda_1, \lambda_2, \ldots, \lambda_n\}$ are obtained. A new program (tp) can be tagged based on its detailed information 212 by representing tp as a vector at 214, and, using Equation 1, computing $P(c_1|tp), P(c_2|tp), \ldots, P(c_i|tp), \ldots, P(c_n|tp)$ for each domain in step 216. Finally, the domain $c:c=\text{argmax}(P(c_i|tp))$ can be selected at step 218.

Returning briefly to FIG. 3, the result of tagging and classifying of the program information is stored in EPG database 54. At the same time, EPG database manager 114 is also responsible for download and update of the EPG database 54 in a timely manner to ensure provision of the latest program information for the user. Simultaneously, EPG database manager 114 is responsible for deletion of outdated program information.

Figure 6:
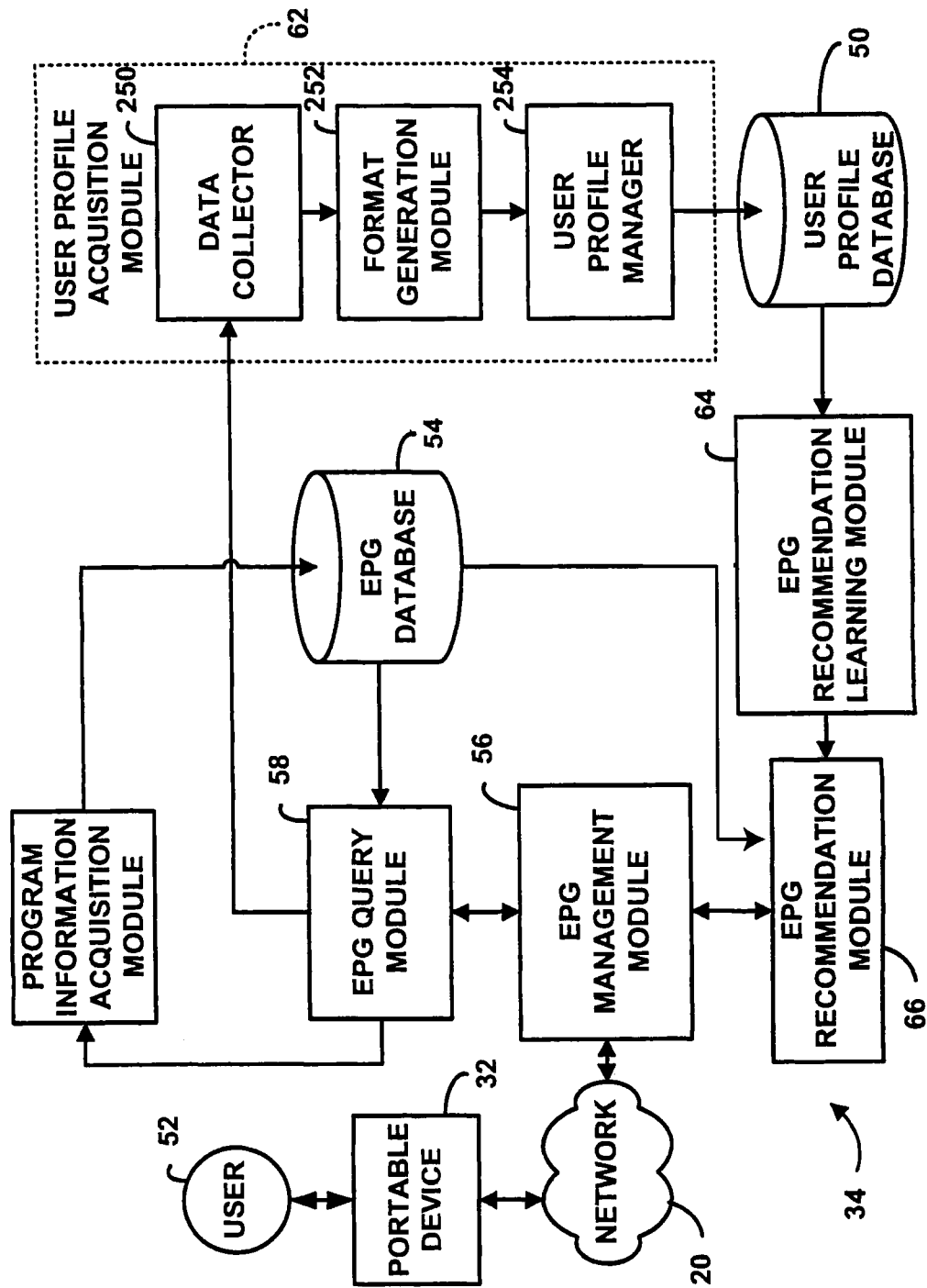
FIG. 6 is a block and flow diagram illustrating user profile acquisition according to the present invention.

Turning now to FIG. 6, user profile acquisition module 62 obtains and manages information of user interest. The purpose of EPG recommendation module 66 is to recommend program information of interest to the user, based on user profile database 50.

User profile acquisition occurs in response to access by the user 52 of the contents of the EPG database 54. The application of program scan is sent out by the user 52 at the portable device 32 terminal, passes through the network 20, and EPG management module 56. After arrival at EPG query module 58, one copy of the query result is sent to data collector 250 by EPG query module 58.

The query result is parsed by data collector 250 as it is received, and useful information such as program domain and category is extracted and transmitted to format generation module 252. Program information is then converted into a pre-defined format by format generation module 252. The formatted program information is then saved in user profile database 50 by user profile manager 254.

The data sent out from the portable device 32 terminal by the user are transmitted to the system 34 by the network 20. Therefore, the question of transmitting data through the network is involved. In accordance with the present invention, the data to be transmitted can be packaged as XML format, and then delivered to the network 20. At the portable device 32 terminal or framework terminal, the data can similarly be packaged and delivered to the network for transmission; correspondingly, the XML data bundle received from the network 20 at the two terminals can be parsed by each function module to pick-up the information therein, and then carry through the other treatments.

As discussed above, the user's profile information is saved in user profile database in a format that is specified in advance. Data collector 250 parses the data transmitted by network 20, and delivers the parsed results to format generation module 252. According to the format, attribute information such as title, time, and category can be extracted from the obtained data by format generation module 252, and can be converted into the format specified for user profile database 50 in advance. Then, the formatted data can be delivered to user profile manager 254 and saved in user profile database 50.

User profile information for a particular user can be saved in user profile database 50. User profile manager 254 is responsible for saving the formatted program information in user profile database 50, and also for daily maintenance work, such as deletion of outdated data in the user profile database 50.

Figure 7:
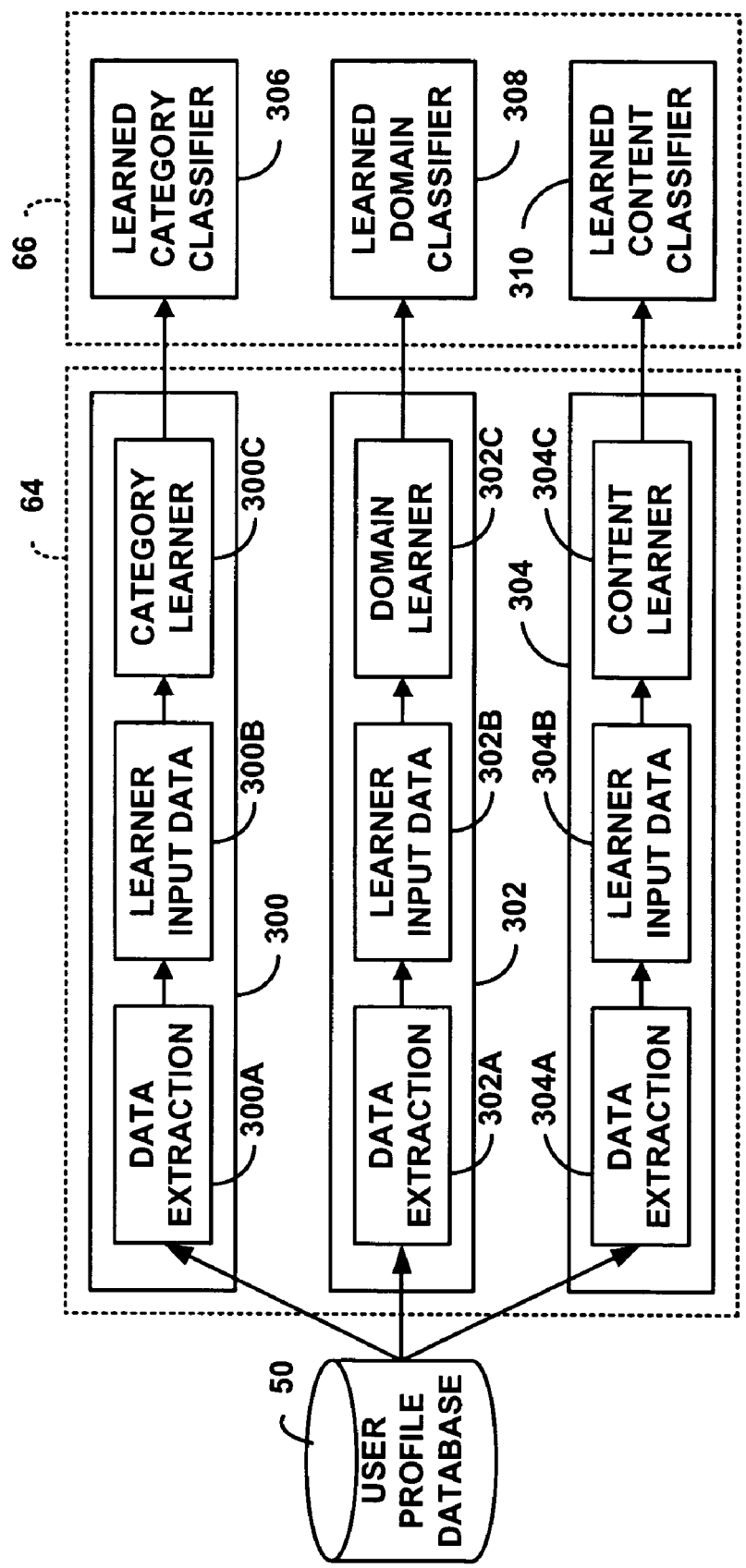
FIG. 7 is a block and flow diagram illustrating classifier learning in accordance with the present invention.

Turning now to FIG. 7, EPG recommendation learning module 64 trains parameters of three levels 300-304. For example, category data is extracted from user profile database 50 for a particular user by category data extractor 300A. The categories information of the programs sought by the user can be used by category learning layer 300, and passed by extractor 300A as category learner input data 300B to category learning module 300C. Next, the probability of these extracted categories is computed. The probability is defined as the following equation:

$$P(c_i) = \frac{N(c_i)}{\sum_{j=1}^{|C|} N(c_j)},$$

where C denotes the set of categories, $c_i$ denotes a category, and $N(c_i)$ denotes the frequency of $c_i$. Finally, the categories can be sorted by the probabilities. Thus, a list of sorted categories that the user likes is obtained. Learned category classifier 306 can therefore recommend the programs using the list.

For program domains layer 302, domain data is extracted from user profile database 50 for a particular user by domain data extractor 302A. The domains information 302B of the programs sought by users can be passed to domain learning module 302C. Then, the probability of these extracted domains can be computed. The probability is defined as the following equation:

$$P(d_i) = \frac{N(d_i)}{\sum_{j=1}^{|D|} N(d_j)},$$

where D denotes the set of Domains, $d_i$ denotes a domain, and $N(s_i)$ denotes the frequency of $s_i$. Finally, the domains can be sorted by the probabilities. Thus, a sorted list of domains that the user likes is obtained. Learned domain classifier 308 can recommend the programs using the list.

For program content layer 304, a corpus is constructed that includes liked and disliked programs. These programs can be obtained from the user profile database 50 for a particular user by data extractor 304A. First, a LikeFlag(user like or not) is extracted for title and simple description of programs in user profile database 50. A corpus is obtained that includes the programs which are marked as UserLike or UserDislike. Then, the programs can be represented as vectors as described above, and these vectors can be passed as input data 304B to content learning module 304C. Next content classifier 310 is trained using these vectors using, for example, MaxEnt as the classifier. During training, the parameters can be generated and saved as a file. Finally, a binary classifier 310 is obtained which can tell whether a program is recommended or not. Classifiers 306-310 are employed as part of recommendation module 66.

Figure 8:
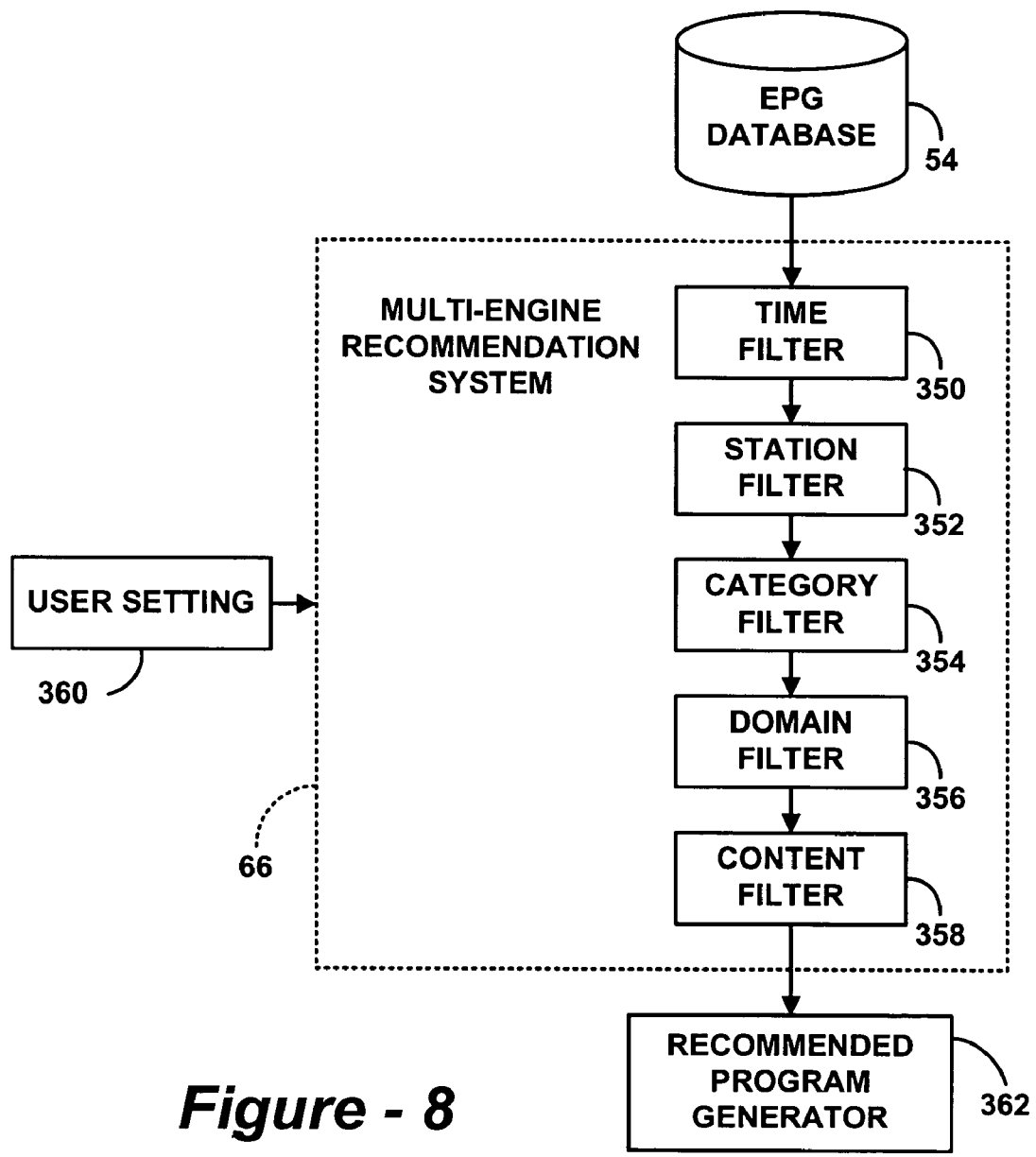
FIG. 8 is a block and flow diagram illustrating the multi-engine recommendation system according to the present invention.

Turning now to FIG. 8, the recommendation processing carried out by recommendation module 66 can be modeled as a plurality of filters, some of which can be trained, and some of which can be set by the user. For example, there can be five levels of filters: time filter 350, station filter 352, category filter 354, domain filter 356, and content filter 358.

The user can set one or more of the filtering conditions by specifying a user setting 360. Then the system will recommend the programs according to these conditions. For example, in time setting, the user can define a period of time. For example, the user can set a time period from 2004-10-6::0:00 to 2004-10-8::24:00. Alternatively or additionally, a default time setting can be employed, such as the recent week. Also, in station setting, the user can select which stations' program to be recommended. Alternatively or additionally, a default setting can be provided, such as all stations, a currently tuned station, or favorite channels as determined by user settings or automatically learned favorites from frequency and/or duration of use by the user.

Further, in category setting, the user can be provided three choices: not to use category recommendation; to use category recommendation; or use a specifically defined category recommendation. If the user selects to bypass category recommendation, the system will ignore this part of the recommendation/filtering process. If the user selects to use automatic category recommendation, the system can use the learned category classifier to recommend the program by the sorted categories. If the user selects to specifically define one or more categories by which to filter, the system can recommend programs according to user selection of available categories, or by searching for input categories. Input categories can also be fed through a synonym generator to look for available categories. These categories can be presented to the user for final selection.

Further still, in domain setting the user can be presented with three choices: not to use domain recommendation; to use automatic domain recommendation; or use specifically defined domain recommendation. If the user selects to bypass domain recommendation, the system can ignore this part of the recommendation process. If the user selects to use automatic domain recommendation, the system can use the learned domain classifier to recommend the program by the sorted domains. If the user selects to specifically define their own domain recommendation, the system can recommend programs according to input domains, which can be entered as text and matched to available domains and/or can be presented to the user for selection.

Even further, in content setting, the user can be presented with two choices: not to use content recommendation; or to use automatic content recommendation. If the user selects to bypass content recommendation, the system can ignore this part of the recommendation process. If the user selects to use automatically content recommendation, the system can use the learned content classifier to recommend the program.

During the filtering process, the candidate programs are read from EPG database 54, the contents of which are collected from the Internet or other media. The user provides the desired settings, and the recommended programs are generated. For example, all programs can be read from EPG database 54 as the candidates. Then, time filtering can remove all programs that do not play within the specified time period. Thus, if the setting is "from 2004-10-6::0:00 to 2004-10-8:: 24:00", then programs playing on October 9 are be removed. Also, station filtering removes from the remaining candidates the programs which do not play on the defined stations. Thus, if the setting is "CCTV", then LNTV's programs are removed.

If selected by the user, automatic category filtering operates on the remaining candidates by using the learned category classifier to recommend the program by the sorted categories. Thus, only the programs whose category is included in top n categories of the sorted categories, n being a predefined threshold, are kept to the next processing. Alternatively or additionally, manual category filtering recommends programs according to selected categories defined by the users. Thus, only the programs having categories included in the selected categories are kept for further processing. This filtering step can be bypassed by the user, such that all candidates are kept for further processing.

If selected by the user, automatic domain filtering uses the learned domain classifier to recommend the program by the sorted domains. Thus, only the programs having categories included in top n domains of the sorted domains, n being a predefined threshold, are kept for further processing. Alternatively or additionally, the system can recommend programs according to the input domains selected by the user. Thus, only the programs having categories included in the selected domains are kept for further processing. Domain processing can be bypassed by the user, such that all candidates are kept for further processing.

If selected by the user, automatic content filtering uses the learned content classifier to recommend programs. The classifier classifies the candidate programs into two groups: liked and disliked. The disliked programs are removed. Content filtering can be bypassed by the user, so that all candidates are kept for further processing.

After the filtering process, the remained programs are the recommended programs, and recommended program generator 362 places the recommended programs into a human readable format. The recommended programs, which are generated from the recommendation system, are the records of database 54. Accordingly, these records cannot be understood easily by humans. Thus, the results are regenerated by recommended program generator 362, preferably in an xml format. Table 1 shows a sample recommended program in XML format.

TABLE 1

```
<?xml version='1.0' encoding='utf-8'?>
<messageDescription>
    <channel>KIDY 6</channel>
    <title>Spin City</title>
    <Episodetitle>An Affair Not to Remember </Episodetitle>
    <category>Comedy</category>
    <Date>10/06/2004</Date>
    <Time>11:30 PM</Time>
    <detail>A flashback to Caitlin and Charlie's college days, and
his interference with her relationship, gives Caitlin doubt about her
current beau. Tom: Perry King. Debbie: Jill Tracy. Tiffany: Rene
Ashton. Chad: Johnny Hawkes. Britney: Sabrina Speer.
(2002)</detail>
</messageDescription>
```

The XML formatted programs can therefore be communicated to the user for presentation according to the user's predefined style sheet.

The description of the invention is merely exemplary in nature and, thus, variations that do not depart from the gist of the invention are intended to be within the scope of the invention. For example, the preceding description envisions collection of EPG contents from publicly available web sites based on user location so that only one EPG database needs to be maintained without conflicting, location dependent identifications of available programs. Nevertheless, it remains possible that embodiments of the present invention can collect contents for multiple locations. Thus, multiple EPG databases can be maintained, one for each location, and/or the user can filter EPG contents based on location. Further, the order of filters in the recommendation engine can vary according to the implementation considerations or a user's behavior. For example, if a user heavily depends on content filtering in most of the recommendation scenarios, the content filtering engine may be placed ahead of category and domain filter in order to speed up the recommendation process. Thus, the order of filters can be pre-defined and/or can change dynamically according to the system dynamics. Such variations are not to be regarded as a departure from the spirit and scope of the invention.

What is claimed is:

1. An EPG contents collection and recommendation system, comprising:
    an EPG database of identifications of available programs, the programs being assigned to a plurality of categories;
    a program information acquisition module applying text classification to detailed descriptions of the available programs and computing probabilities of a program being associated with a domain based on a plurality of feature functions, said domain having a collection of programs from one or more of the plurality of categories and having a common trait that is not defined by the plurality of categories; and
    an EPG recommendation module recommending an available program to a user based on the text classification;
    wherein said program information acquisition module computes $P(c_1|tp)$, $P(c_2|tp)$, ..., $P(c_i|tP)$, ..., $P(c_n|tP)$ for each domain according to $$P_\Lambda(y|x) = \frac{1}{Z_\Lambda(x)} \exp\left[\sum_{i=1}^{n} \lambda_i f_i(x, y)\right] \quad (1)$$

where $\Lambda = \{\lambda_1, \lambda_2, \ldots, \lambda_n\}$ are parameters of the vector representation, $f_i(x,y)$'s are feature functions modeled according to the vector representation, and $$Z_\Lambda(x) = \sum_y \exp\left[\sum_{i=1}^{n} \lambda_i f_i(x, y)\right]$$

is a normalization factor that ensure $P_\Lambda(y|x)$ is a probability distribution.

2. An EPG contents collection and recommendation system, comprising:
    an EPG database of identifications of available programs, the programs being assigned to a plurality of categories;
    a program information acquisition module applying text classification to detailed descriptions of the available programs and computing probabilities of a program being associated with a domain based on a plurality of feature functions, said domain having a collection of programs from one or more of the plurality of categories and having a common trait that is not defined by the plurality of categories; and an EPG recommendation module recommending an available program to a user based on the text classification;

wherein said program information acquisition module tags a new program (tp) based on its detailed information by representing tp as a vector and computing $P(c_1|tp)$, $P(c_2|tp), \ldots, P(c_i|tP), \ldots, P(c_n|tP)$ for each domain c;

wherein said program information acquisition module selects a domain c for the new program according to:

$c = \mathrm{argmax}(P(c_i|tp))$.

3. An EPG contents collection and recommendation system, comprising:

an EPG database of identifications of available programs, the programs being assigned to a plurality of categories;

a program information acquisition module applying text classification to detailed descriptions of the available programs and computing probabilities of a program being associated with a domain based on a plurality of feature functions, said domain having a collection of programs from one or more of the plurality of categories and having a common trait that is not defined by the plurality of categories;

an EPG recommendation module recommending an available program to a user based on the text classification;

a user profile acquisition module extracting information indicative of user interest in available programs from user interaction with said EPG database, wherein said user profile acquisition module reformats the information indicative of user interest into user profile information that records attribute information including one or more of title, time, category, domain, and a flag indicating whether the user liked or disliked the program in question, wherein said user profile acquisition module records the user profile information in a user profile database, and maintains the user profile database by removing outdated user profile information; and an EPG recommendation learning module training one or more classifiers based on the user profile information, wherein said EPG recommendation learning module trains a category classifier by: (a) computing probability of categories extracted from a record of user profile information according to:

$$P(c_i) = \frac{N(c_i)}{\sum_{j=1}^{|C|} N(c_j)},$$

where C denotes a set of categories, $c_i$ denotes a category, and $N(c_i)$ denotes frequency of $c_i$; and (b) sorting categories according to the probabilities to obtain a list indicating user interest relating to categories of available programs.

4. An EPG contents collection and recommendation system, comprising:

an EPG database of identifications of available programs, the programs being assigned to a plurality of categories;

a program information acquisition module applying text classification to detailed descriptions of the available programs and computing probabilities of a program being associated with a domain based on a plurality of feature functions, said domain having a collection of programs from one or more of the plurality of categories and having a common trait that is not defined by the plurality of categories;

an EPG recommendation module recommending an available program to a user based on the text classification;

a user profile acquisition module extracting information indicative of user interest in available programs from user interaction with said EPG database, wherein said user profile acquisition module reformats the information indicative of user interest into user profile information that records attribute information including one or more of title, time, category, domain, and a flag indicating whether the user liked or disliked the program in question, wherein said user profile acquisition module records the user profile information in a user profile database, and maintains the user profile database by removing outdated user profile information; and an EPG recommendation learning module training one or more classifiers based on the user profile information, wherein said EPG recommendation learning module trains a domain classifier by: (a) computing probabilities of domains extracted from a record of user profile information according to:

$$P(d_i) = \frac{N(d_i)}{\sum_{j=1}^{|D|} N(d_j)},$$

where D denotes a set of domains, $d_i$ denotes a domain, and $N(s_i)$ denotes frequency of $s_i$; and (b) sorting the domains according to the probabilities to obtain a list indicating user interest relating to domains of available programs.

* * * * *